May 10, 1949. E. PELL 2,469,440
DYNAMOELECTRIC MACHINE CONTROLLER
Filed Dec. 28, 1945 2 Sheets-Sheet 1
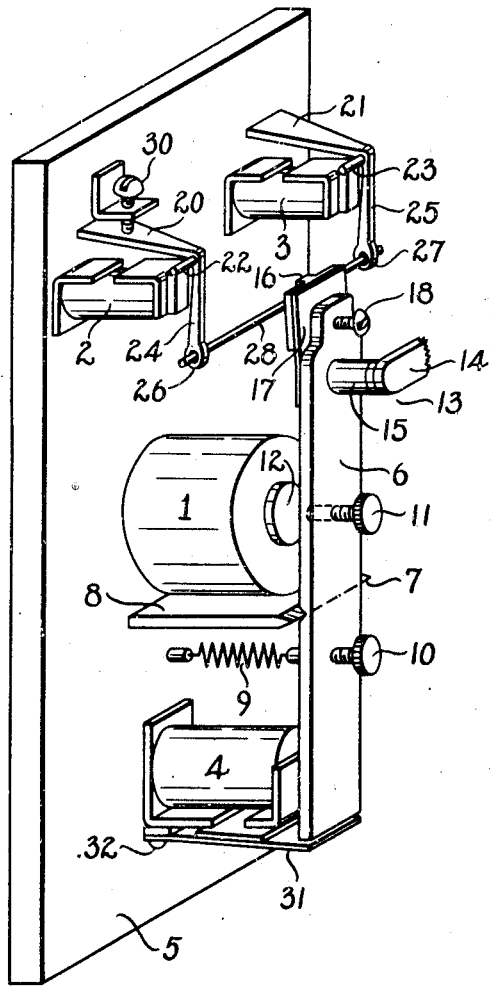
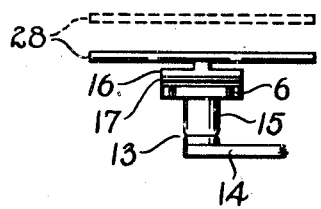
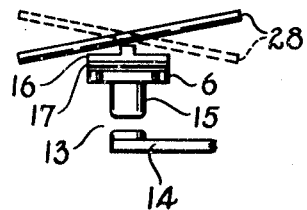
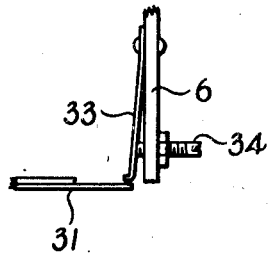
Inventor
Eric Pell
By
Attorney

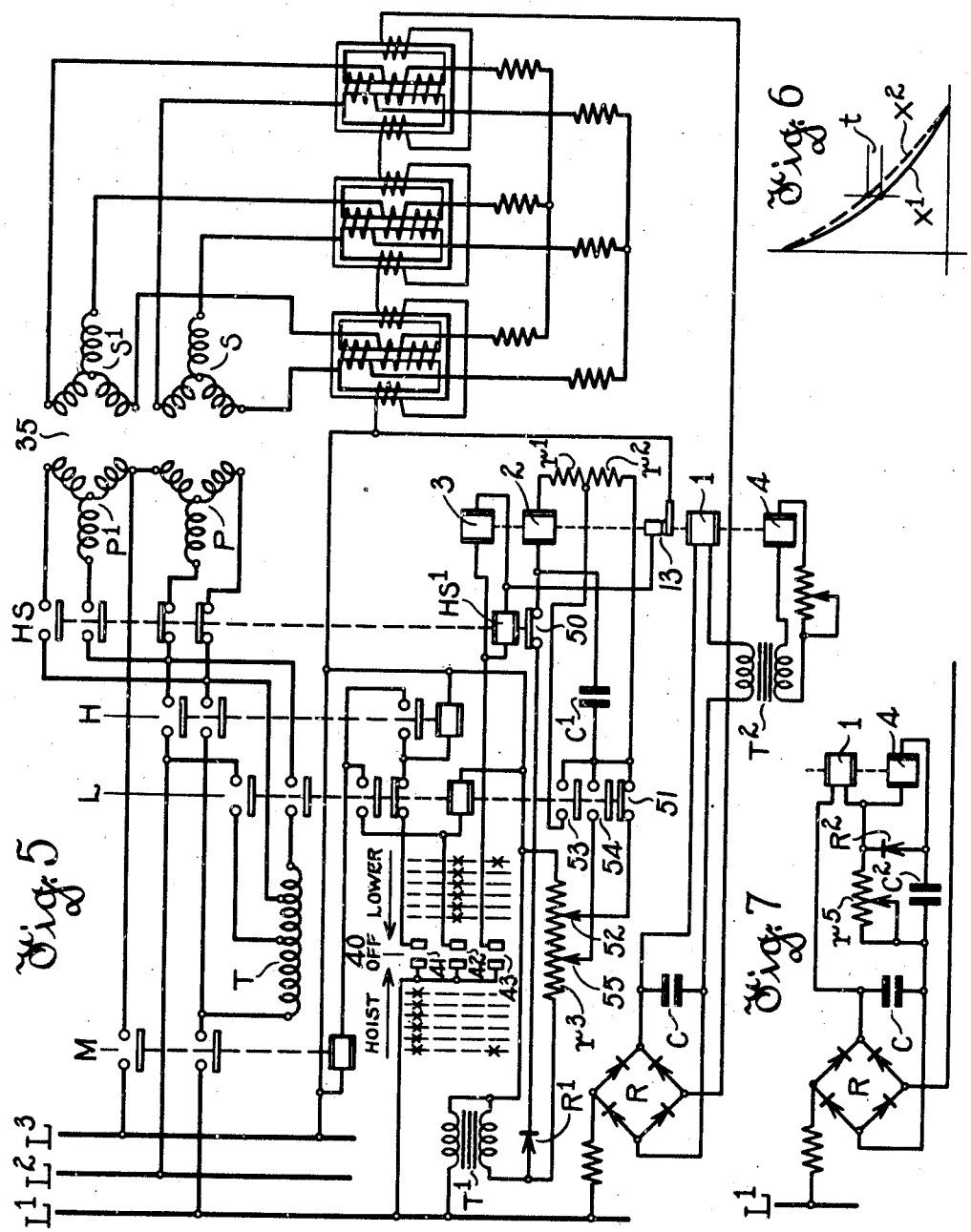

Patented May 10, 1949

2,469,440

UNITED STATES PATENT OFFICE 2,469,440

DYNAMOELECTRIC MACHINE CONTROLLER

Eric Pell, Shorewood, Wis., assignor to Cutler-Hammer, Inc., Milwaukee, Wis., a corporation of Delaware Application December 28, 1945, Serial No. 637,658

8 Claims. (Cl. 318—195)

This invention relates to improvements in dynamo electric machine controllers functioning in certain respects automatically, subject to control by electrical conditions of the circuit of the controlled machine.

While not limited thereto controllers embodying the invention are especially advantageous in control of multi speed alternating current motors employed in hoist service, where it is desired to render speed control subject to influence by load conditions.

A controller of this general type is disclosed in my Patent No. 2,415,189, issued February 4, 1947, such controller having a load relay subjected to control by current proportional to the current of the motor secondary circuit through the medium of means affording such relay certain very advantageous characteristics, and the present invention has among its objects to provide a form of relay and circuits therefor to afford the aforementioned system certain additional very advantageous operating characteristics.

A more specific object of the invention is to provide for such a system a load relay and circuits therefor which afford the system advantageous operating characteristics in both hoisting and lowering.

Another object is to provide a load relay which when the controlled motor is attempting to accelerate to high speed in hoisting remains unresponsive to normal surges of current for a given accelerating period but which effects appropriate circuit commutations should the motor fail to accelerate within such period, or should the motor within such period be subjected to abnormal and objectionable electrical load conditions.

Another object is to provide such a relay which in lowering will be self-locking against certain needless operations.

Another object is to provide a relay to so function which will be reliable in operation and capable of adjustment but yet being of simple and rugged construction.

Other objects and advantages of the invention will hereinafter appear.

The accompanying drawings illustrate one embodiment of the invention which will now be described, it being understood that the embodiment illustrated is susceptible of various modifications without departing from the scope of the appended claims.

In the drawings,

Figures 1 to 4 show more or less schematically a preferred form of load relay;

Fig. 5 is a diagrammatic view showing embodiment of such relay in a hoist controller of the type disclosed in my copending application aforementioned;

Fig. 6 is a chart of certain characteristic curves, and

Fig. 7 is a diagrammatic view of a circuit modification.

Referring to Figs. 1 to 4, the relay comprises electromagnets 1, 2, 3 and 4 fixed to a support 5, the electromagnet 1 having an armature member 6 fulcrumed on the knife edge 7 of an element 8 fixed to the support 5, said armature being biased away from electromagnet 1 by a spring 9 connecting said armature member at a point below the fulcrum thereof to the support 5 and said spring having adjusting means 10. Also the armature member 6 has an adjustable stop 11 to engage the core 12 of electromagnet 1 to adjust the normal air gap between said armature member and said core. As will be apparent, electromagnet 1 constitutes the main or operating electromagnet of the relay and through the medium of the armature member 6 controls a switch 13 comprising a stationary contact 14 and a contact 15 fixed to the armature member. The switch contacts are so arranged that under the bias of the armature member 6 by spring 9 they are engaged, and as will be understood the stationary contact 14 may be provided with adjusting means not shown to adjust it toward or away from the contact 15.

The electromagnets 2 and 3 are respectively provided with armatures 20 and 21 which are respectively fulcrumed at points 22 and 23 and which are respectively provided with substantially right angle extensions 24 and 25. The armature extensions 24 and 25 have socket portions 26 and 27, respectively, for a rod 28, extending across the path of upper extremity of the armature member 6 which preferably has for engagement with the rod 28 a ribbed plate 16 adjustable relative thereto into the desired relation with said rod. To afford such adjustability, plate 16 is shown as carried by a leaf spring 17 suitably attached at its lower end to armature member 6, and member 6 carries an adjusting screw 18 bearing against such yieldingly supported plate. With both electromagnets 2 and 3 fully energized, the rod 28 engages the rib 16 on the armature member 6 to lock the switch contacts in engagement against the pull of the main electromagnet 1, whereas with both electromagnets 2 and 3 deenergized the rod 28 will yield to the dotted line position shown in Fig. 2 to permit electromagnet 1 to attract the armature member to disengage the switch contacts. Also the rod 28 will yield to the oblique position shown in full lines in Fig. 3 to permit the switch contacts to be disengaged when electromagnet 3 is deenergized while electromagnet 2 remains energized, whereas said rod will yield to the oblique position shown in dotted lines to permit the switch contacts to disengage when electromagnet 2 is deenergized while electromagnet 3 remains energized. For freedom of motion of the rod 28 it may be desirable in practice to provide one of the numerous types of universal connections between the rod and each of the supporting members 24 and 25, the connection shown having been selected for simplicity of illustration. Preferably the armature of each of the electromagnets 2 and 3 is provided with an adjustable stop 30, only one such stop being shown in the drawing.

The electromagnet 4 is provided to latch the armature member 6 in a position disengaging the switch contacts 14 and 15, it being provided with a resilient armature assembly 31 fixedly supported at 32 and adapted to be drawn upwardly into the return path of the lower extremity of the armature member 6 when such extremity moves outwardly, thereby to block dropout of armature 6. Armature 31 tends to spring out of locking position when electromagnet 4 is deenergized, and for a purpose hereinafter set forth it may be desired to provide the armature 6 with a hooked spring 33 (Fig. 4) to block dropout of armature 31 under certain conditions.

Referring to Fig. 5, the same shows a motor 35 having a low speed primary winding P, a high speed primary winding $P^1$, a low speed secondary winding S, and a high speed secondary winding $S^1$. The high and low speed primary windings are connected in circuit selectively by a double throw electro-responsive switch HS which is under the control of a relay of the type hereinbefore described, the windings 1, 2, 3, 4 and switch 13 of said relay being here shown diagrammatically in vertical alignment. The primary connections of the motor 35 to lines $L^1$, $L^2$ and $L^3$ are of conventional form and include in lowering an autotransformer T for connection between the motor primary windings and the supply circuit, for voltage unbalance of the motor primary. For hoisting, motor primary connections are established to lines $L^1$, $L^2$ and $L^3$ by an electroresponsive hoist switch H and an electroresponsive main switch M, whereas for lowering the motor primary connections including those of the autotransformer are completed by an electroresponsive lowering switch L and main switch M. The electroresponsive switches aforementioned are shown to be under the control of a drum type master switch 40 which for simplicity of illustration is shown only in part. As will be understood, it is customary to provide for commutation of the connections of the autotransformer for different speeds through the medium of switches here omitted for simplicity of illustration and the master switch 40 would customarily comprise additional contacts for control of additional switches including those just mentioned.

The master drum 40 is shown as having six hoisting and six lowering positions on either side of an off position and the sets of contacts shown are disengaged in the off position, being respectively engaged in the running positions indicated by crosses and disengaged in all other running positions. The contacts 41 control the hoist switch H and through said switch they also control main switch M. The contacts 42 control the lowering switch L and through said switch they also control main switch M. Contacts 43 control the speed switch HS which is biased to low speed position and is energizable through the medium of contacts 43 to establish high speed motor connections but subject to control by the load relay.

The motor secondary connections are the same as in the system set forth in the aforementioned copending application and include saturable reactors having a number of coils in series in a circuit connected across lines $L^1$ and $L^3$ through a double rectifier R to which is connected the main coil 1 of the load relay to receive a direct current which is a function of the secondary current of the motor. The winding 1 is paralleled by a condenser C and in the respects just described the relay does not differ from that of the copending application aforementioned.

Considering now the additional control circuits here provided for the relay, its winding 3 is connected in parallel with the winding $HS^1$ of the high and low speed switch HS to be energized with said switch and so long but only so long as said switch is energized. On the other hand, the relay winding 2 is energized when switch HS is deenergized and is subject to interruption of its energizing circuit by response of switch HS. The energizing circuit of winding 2 extends from line $L^1$ through a transformer $T^1$, a single rectifier $R^1$ and normally engaged contacts 50 of switch HS to and through said winding 2, resistors $r^1$ and $r^2$, and normally engaged contacts 51 of switch L to an adjustable tap 52 of a potentiometer type rheostat $r^3$ connected across lines $L^1$ and $L^3$ through transformer $T^1$. Moreover winding 2 and its series resistors $r^1$ and $r^2$ are paralleled by a condenser $C^1$ which maintains said winding energized for a given transient period after interruption of the line connection of said winding by the energization of switch HS. With switch L deenergized, condenser $C^1$ will attain a charge proportional to the voltage across the portion of potentiometer resistor $r^3$ to the left of tap 52 and the time constant of the timing circuit of winding 2 will be proportional to the total resistance of the circuit including resistors $r^1$ and $r^2$, whereas with switch L energized for closure of its contacts 53 and 54 and opening of its contacts 51, condenser $C^1$ will attain a relatively lower charge as measured by the voltage across the portion of the potentiometer resistor $r^3$ to the left of tap 55 and the time constant of the aforementioned timing circuit will be proportional to the resistance of the circuit including resistor $r^1$ only. By thus varying both the voltage on the condenser and the resistance of the timing circuit, the rate of current discharge by the condenser through the winding 2 may be adjusted for adjustment of the pull-time characteristic of said winding 2 to closely follow the pull-time characteristic of winding 1 of the relay during acceleration of the motor, as depicted in Fig. 6, curve $X^1$ depicting the pull-time characteristic of winding 1 and the broken line curve $X^2$ depicting the pull-time characteristic of winding 2.

Thus assuming the relay to be adjusted for operation by winding 1 to open its contacts when said winding is subjected to a given rising current derived from the motor secondary and to release when the current through said winding falls to a given value slightly lower than when effecting its first operation it will function under the control of windings 2 and 3 in the manner now to be described. In starting in hoisting direction the relay is free to respond and does respond to the starting surge of current for its response if not blocked by the windings 2 and 3. While winding 2 is energized the winding 3 is not energized, with the result that the locking rod 28 will yield to the position shown in full lines in Fig. 3. Then assuming a not excessive load and normal acceleration of the motor, the relay will release, enabling energization of the switch HS by the master switch through the now engaged contacts of the relay. Relay winding 3 being energized with the winding of switch HS and winding 2 remaining energized for a transient period, as heretofore explained, said windings 2 and 3 will cooperate to hold the locking rod 28 in the position shown in full lines in Fig. 2 to lock the relay against operation by winding 1 for a transient period under conditions regulable by adjustments of the relay and its connections. The adjustments make it possible to afford the winding during the transient period of its continued energization by the stored energy of condenser $C^1$ a locking pull proportional to the closing pull of the relay as shown in Fig. 6 if the load current during acceleration follows the desired curve, and in such case the relay is effectively locked for the transient period desired for acceleration and then is unlocked for response to deenergize switch HS if the load current thereafter becomes excessive. If, on the other hand, the load current becomes excessive during the transient period allowed for accelerating then the operating force of the relay will after a short time interval $t$ shown in Fig. 6 preponderate the holding force of the winding 2 and disengage its contacts to deenergize switch HS within the aforementioned period allowed for normal acceleration. When switch HS releases to establish slow speed connections it again energizes winding 2, but meanwhile winding 3 is deenergized with switch HS, wherefore the rod 28 does not in any way interfere with the relay pending reenergization of winding 3.

In lowering a non-overhauling load like action of the relay is desired and is obviously provided for, except that the transient period of energization of winding 2 is shortened, this being desirable because acceleration in lowering is faster. Such shortening of the transient period is effected as aforedescribed by response of switch L for reduction in the condenser voltage and for exclusion of resistor $r^2$ from the loop including the winding 2 and condenser $C^1$, said resistor being left in circuit in hoisting to obtain a longer transient period.

Under overhauling load conditions it is, of course, unnecessary to re-transfer during acceleration except in case of sudden jamming of the driven machine and it is, therefore, only necessary to guard against the holding pull of the winding 2 exceeding the operating pull of winding 1 at a speed and load for which the relay is set to respond.

As will be understood, the armature member 6 is adjustable for pickup and dropout by adjustment of spring 9 and adjustment of the air gap between the armature member and the core of electromagnet 1. Also as indicated the charge of condenser $C^1$ may be varied through the medium of the potentiometer rheostat while the discharge time of said condenser may be varied through variation of the resistors shown to obtain an equivalent current or magnet pull characteristic matching that of the electromagnet 1.

The condenser C connected across the coil 1 prevents the relay from releasing in the region of synchronous speed during change from high speed connections to low speed connections in the hoisting direction. In lowering with a heavy load and with the master switch in lowering position 6 the load relay will effect establishment of high speed connections as synchronism for the low speed windings is approached and will effect re-establishment of slow speed connections as the overhauling load on the high speed windings takes effect.

Addition of the lockout electromagnet 4 affords means for preventing such operation of the relay for transfer to high speed connections in lowering unless the load is sufficiently light. As shown in Fig. 5 the electromagnet 4 is connected across the secondary of a transformer $T^2$ having its primary in series with the winding, which as heretofore pointed out is supplied with rectified current varying with the current of the motor secondary circuit. Such transformer will induce in its secondary for supply to the winding 4 current proportional to the rate of change of the primary flux, which is a function of the rate of change of the rectified current and hence of the motor speed, thus enabling electromagnet 4 to lock the relay against dropout when the acceleration is as rapid as under heavy load conditions.

At synchronous speed of the motor the current in the electromagnet 4 diminishes rapidly, and hence said electromagnet although it has lifted its armature to latching position will tend to release its armature to free the relay. Thus it is preferred to provide the armature 6 with the aforementioned hooked spring 33 of Fig. 4 to restrain armature 31 against release pending further acceleration with a consequent increase in pull on the armature 6, this permitting greater freedom of the spring and consequent release of armature 31 when not restrained by the magnetic pull of electromagnet 4. To effect proper functioning of the hooked spring it is preferably provided with the adjusting means 34 shown in Fig. 4.

Winding 4 may also be connected in other ways including that shown in Fig. 7 wherein there is substituted for the transformer $T^2$ supplying the winding 4 a condenser $C^2$ and an adjustable resistor $r^5$ paralleled therewith through a rectifier $R^2$. The paralleled condenser and resistor are connected between winding 1 and rectifier R which is to be connected as in Fig. 5 for energization of winding 1 subject to control by load conditions, as heretofore explained. The rectifier $R^2$ is in circuit between the condenser $C^2$ and winding 1, and the winding 4 is connected across the rectifier $R^2$. This circuit provides for charging of the condenser $C^2$ by current supplied to winding 1 and bypassing winding 4. Then after response of the relay through energization of winding 1 the discharge of the condenser $C^2$ must, because of rectifier $R^2$, traverse the winding 4, the discharge current being proportional to the rate of change of voltage on condenser $C^2$ or to the change in load relay current passing adjustable resistor $r^5$, and hence the effect on winding 4 will be the same as that of the transformer $T^2$. On the other hand, this modified circuit eliminates certain undesired inductive effects on the winding 1 which are characteristic of the circuit of Fig. 5.

What I claim as new and desire to secure by Letters Patent is:

1. In combination, a multi speed alternating current motor, means to effect establishment selectively of low speed and high speed connections for said motor, and a control relay for said means, said relay comprising electroresponsive operating means responsive to current of given value and subjected to current varying with the motor current and also comprising means effective upon establishment of high speed connections to block operation of said relay in response to a surge of motor current to such value, but said blocking means being effective for a transient period only and only when the motor current is not excessive for normal acceleration of said motor to its high speed.

2. In combination, a multi speed alternating current motor, means to effect establishment selectively of low speed and high speed connections for said motor, and a control relay for said means, said relay comprising electroresponsive operating means responsive to current of given value and subjected to current varying with the motor current and also comprising means effective upon establishment of high speed connections to block operation of said relay in response to a surge of current to such value, said blocking means comprising an electromagnet and means supplying it with a transient current for a magnetic pull characteristic substantially matching that of said operating means under normal accelerating conditions.

3. In combination, a multi speed alternating current motor for load hoisting and lowering, means to effect establishment selectively of hoisting and lowering connections and also of low speed and high speed connections for said motor, a control relay for said means, said relay comprising electroresponsive operating means which in both hoisting and lowering renders said relay responsive to current varying with the motor current and also comprising means effective upon establishment of high speed connections to block operation of said relay by said electroresponsive means when the motor current is not excessive for normal acceleration to a high speed, but said blocking means being effective for a transient period only, and means to differentiate in duration the transient period in hoisting and the transient period in lowering.

4. In combination, a multi speed alternating current motor for load hoisting and lowering, means to effect establishment selectively of hoisting and lowering connections and also of low speed and high speed connections for said motor, a control relay for said means, said relay comprising operating means which in both hoisting and lowering is subjected to current varying with the motor current and which renders said relay responsive to increase in motor current to values excessive for certain operating conditions, and also comprising means effective upon establishment of high speed connections to block operation of said relay in response to rising motor current, but said blocking means being effective for a transient period only and only when the motor current is not excessive for normal motor acceleration to high speed, and means to effect differentiation in duration of the transient period in hoisting and the transient period in lowering.

5. In combination, a multi speed alternating current motor for load hoisting and lowering, means to effect establishment selectively of hoisting and lowering connections and of low speed and high speed connections for said motor and a load relay for control of said means, said relay having operating means responsive under given conditions of motor current and also having means responsive to certain electrical conditions in lowering to afford transient restraint against release of said relay after response thereof.

6. In combination, a multi speed alternating current motor for load hoisting and lowering, means to effect establishment selectively of hoisting and lowering connections and of low speed and high speed connections for said motor and a load relay for control of said means, said relay having operating means responsive under given conditions of motor current and also having means responsive to certain electrical conditions in lowering to afford transient restraint against release of said relay after response thereof, and said relay also having means maintaining its said restraining means effective under certain conditions while the current supplied to said restraining means passes through a low value.

7. In combination, a multi speed alternating current motor for load hoisting and lowering, means to effect establishment selectively of hoisting and lowering connections and of low speed and high speed connections for said motor and a load relay for control of said means, said relay having operating means rendering it responsive in both hoisting and lowering under given conditions of motor current and also having means to block its operation under certain of such given conditions but so functioning for temporary periods only, and said relay additionally having means to block its release under predetermined conditions but for transient periods only.

8. In combination, a multi speed alternating current motor for load hoisting and lowering, means to effect establishment selectively of hoisting and lowering connections and of low speed and high speed connections for said motor, and a load relay for control of said means, said relay having electroresponsive operating means rendering it responsive in both hoisting and lowering under given conditions of motor current and also having means to block its operation under certain of said given conditions but so functioning for temporary periods only and said relay additionally having means to block its release under predetermined conditions but for transient periods only, the first mentioned blocking means being effective only upon establishment of high speed connections and having a magnetic pull characteristic substantially matching that of said operating means under normal accelerating conditions and the second mentioned blocking means being responsive as a function of rate of change of an electrical condition in the circuit of said motor to operate only under given load conditions in lowering.

ERIC PELL.

REFERENCES CITED

The following references are of record in the file of this patent:

UNITED STATES PATENTS

| Number | Name | Date |
|---|---|---|
| 2,350,938 | Sparrow | June 6, 1944 |
| 2,393,192 | Ruehrmund | Jan. 15, 1946 |
| 2,415,189 | Pell | Feb. 4, 1947 |